(12) United States Patent
Iwai et al.

(10) Patent No.: US 11,719,155 B2
(45) Date of Patent: Aug. 8, 2023

(54) METHOD FOR OPERATING GAS TURBINE COMBUSTOR

(71) Applicant: TOSHIBA ENERGY SYSTEMS & SOLUTIONS CORPORATION, Kawasaki (JP)

(72) Inventors: Yasunori Iwai, Yokohama Kanagawa (JP); Shinju Suzuki, Yokohama Kanagawa (JP); Masao Itoh, Yokohama Kanagawa (JP); Yuichi Morisawa, Yokohama Kanagawa (JP); Yoshihisa Kobayashi, Yokohama Kanagawa (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/835,518

(22) Filed: Jun. 8, 2022

(65) Prior Publication Data

US 2022/0403791 A1 Dec. 22, 2022

(30) Foreign Application Priority Data

Jun. 21, 2021 (JP) ................................. 2021-102469

(51) Int. Cl.
*F02C 3/34* (2006.01)
*F02C 9/50* (2006.01)
(Continued)

(52) U.S. Cl.
CPC ................. *F02C 3/34* (2013.01); *F02C 1/08* (2013.01); *F02C 9/50* (2013.01); *F23R 3/26* (2013.01);
(Continued)

(58) Field of Classification Search
CPC ...... F02C 3/34; F02C 1/08; F02C 9/50; F02C 1/005; F23R 3/26; F05D 2260/85;
(Continued)

(56) References Cited

U.S. PATENT DOCUMENTS 3,088,279 A * 5/1963 Diedrich ................... F23R 3/42
60/726
6,070,411 A * 6/2000 Iwai ........................ F23R 3/286
60/737
(Continued)

FOREIGN PATENT DOCUMENTS

EP 2 672 181 A2 12/2013
EP 2 438 281 B1 11/2016
(Continued)

*Primary Examiner* — Gerald L Sung
*Assistant Examiner* — Rene D Ford
(74) *Attorney, Agent, or Firm* — Foley & Lardner LLP (57) ABSTRACT

In a method for operating a combustor of an embodiment, before ignition in the combustor, a mixed gas containing oxygen is circulated through the combustor as a circulating gas. Then, in an operating time from the time of ignition in the combustor to the time of a rated load of a turbine, from the time of ignition until reaching stable combustion conditions allowing stable combustion, a combustion gas in which a controller controls a flow rate of a fuel supplied from a fuel supply part and a flow rate of an oxidant supplied from an oxidant supply part to maintain the same oxygen concentration as an oxygen concentration in the mixed gas is circulated as the circulating gas.

10 Claims, 7 Drawing Sheets

(51) Int. Cl.
*F23R 3/26* (2006.01)
*F02C 1/08* (2006.01)
*F23N 1/02* (2006.01)
*F02C 1/00* (2006.01)

(52) U.S. Cl.
CPC .......... *F02C 1/005* (2013.01); *F05D 2260/85* (2013.01); *F05D 2270/092* (2013.01); *F23N 1/02* (2013.01); *F23N 2227/02* (2020.01); *F23N 2241/20* (2020.01)

(58) Field of Classification Search
CPC .. F05D 2270/092; F23N 1/02; F23N 2227/02; F23N 2241/20
See application file for complete search history.

(56) References Cited

U.S. PATENT DOCUMENTS

| | | | | |
|---|---|---|---|---|
| 2001/0001171 | A1* | 5/2001 | Onoda | F23R 3/36 60/776 |
| 2015/0020497 | A1* | 1/2015 | Iwai | F02C 3/34 60/39.23 |
| 2015/0027099 | A1* | 1/2015 | Iwai | F02C 7/08 60/39.23 |
| 2015/0059313 | A1* | 3/2015 | Itoh | F02C 3/04 60/39.52 |
| 2016/0090911 | A1* | 3/2016 | Iwai | F02C 7/10 60/39.461 |
| 2017/0089205 | A1* | 3/2017 | Joshi | F23C 9/08 |
| 2017/0175624 | A1* | 6/2017 | Iwai | F02C 3/34 |
| 2017/0342860 | A1* | 11/2017 | Morisawa | F23R 3/44 |
| 2018/0023478 | A1* | 1/2018 | Morisawa | F23Q 3/008 60/740 |
| 2019/0145319 | A1* | 5/2019 | Iwai | F02C 3/30 60/39.821 |
| 2020/0025089 | A1* | 1/2020 | Nakamura | F23N 1/022 |

FOREIGN PATENT DOCUMENTS

| | | |
|---|---|---|
| GB | 2 532 334 A | 5/2016 |
| JP | 2000-337107 A | 12/2000 |

\* cited by examiner

METHOD FOR OPERATING GAS TURBINE COMBUSTOR

CROSS REFERENCE TO RELATED APPLICATIONS

This application is based upon and claims the benefit of priority from Japanese Patent Application No. 2021-102469, filed on Jun. 21, 2021; the entire contents of which are incorporated herein by reference.

FIELD

Embodiments described herein relate generally a method for operating a gas turbine combustor.

BACKGROUND

In recent years, in power generation plant including a gas turbine combustor, increasing efficiency is in progress in response to demands for reduction of carbon dioxide, resource conservation, and the like. Under such circumstances, a gas turbine facility in which a part of carbon dioxide discharged from a turbine is circulated through a combustor is under consideration.

Figure 8:
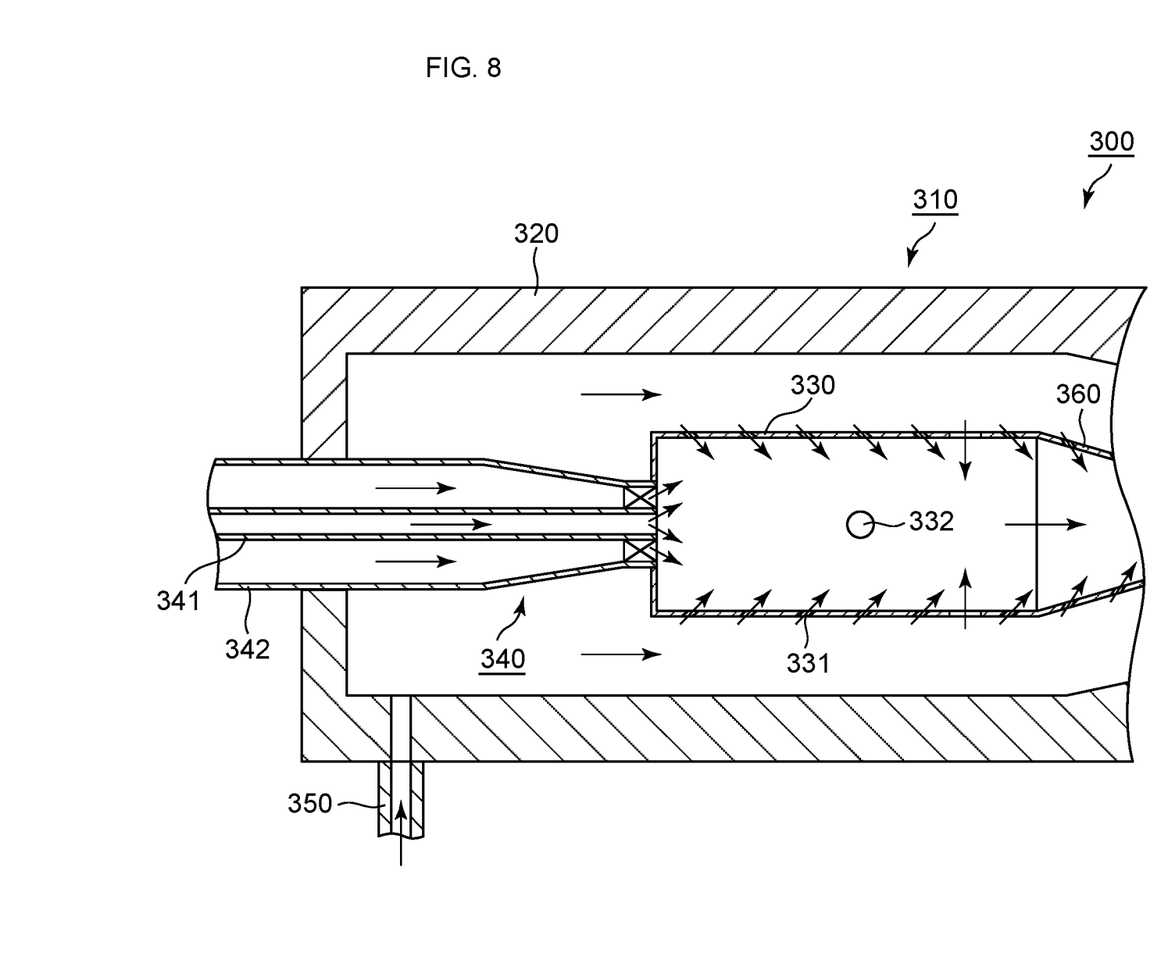
FIG. 8 schematically illustrates a vertical section of a combustor provided in a conventional gas turbine facility.

FIG. 8 schematically illustrates a vertical section of a combustor 310 provided in a conventional gas turbine facility 300. As illustrated in FIG. 8, the combustor 310 includes a combustor casing 320, a combustor liner 330, a fuel-oxidant supply part 340, and a carbon dioxide supply pipe 350.

In the combustor casing 320, the combustor liner 330 and the fuel-oxidant supply part 340 are provided. The combustor liner 330 is constituted by a cylindrical member in which a fuel and an oxidant are combusted.

The fuel-oxidant supply part 340 is provided at one end (upstream end) of the combustor liner 330. Note that at the other end (downstream end) of the combustor liner 330, a transition piece 360 which guides a combustion gas discharged from the combustor liner 330 to a turbine is provided.

The fuel-oxidant supply part 340 includes a fuel supply pipe 341 and an oxidant supply pipe 342. The fuel supply pipe 341 supplies the fuel into the combustor liner. The oxidant supply pipe 342 is provided around an outer periphery of the fuel supply pipe 341, and supplies the oxidant into the combustor liner. A double-pipe structure is formed by the fuel supply pipe 341 and the oxidant supply pipe 342.

The carbon dioxide supply pipe 350 is connected to the combustor casing 320. The carbon dioxide supply pipe 350 supplies carbon dioxide to be circulated through the combustor 310 between the combustor casing 320, and, the fuel-oxidant supply part 340 and the combustor liner 330.

Here, flow rates of the fuel and the oxygen supplied to the combustor liner 330 are regulated so as to have a stoichiometric mixture ratio (equivalence ratio 1). The equivalence ratio which is mentioned here is calculated on the basis of the fuel flow rate and the oxygen flow rate. Note that the equivalence ratio is calculated by dividing a fuel-air ratio by a stoichiometric fuel-air ratio.

In the gas turbine facility 300, the combustion gas discharged from the turbine, from which water vapor is separated, circulates through the combustor 310. Most of components of the combustion gas from which the water vapor has been removed are carbon dioxide. Hence, the combustion gas circulated from the carbon dioxide supply pipe 350 to the combustor 310 is carbon dioxide.

The carbon dioxide circulated through the combustor 310 functions as a cooling medium and a dilution medium. The circulated carbon dioxide is heated by exchanging heat with the combustion gas discharged from the turbine through a regenerative heat exchanger, for example. Further, in the gas turbine facility 300, carbon dioxide pressurized to a critical pressure or more is circulated to the combustor 310, for example.

The carbon dioxide flowing between the combustor casing 320 and the combustor liner 330 is introduced from, for example, cooling holes 331 and a dilution hole 332 formed in the combustor liner 330 into the combustor liner 330.

In the above-described gas turbine facility 300, before initiating combustion in the combustor 310, the carbon dioxide which is filled is circulated to the combustor 310. Then, in a state in which the carbon dioxide is circulated through the combustor 310, the operation of the combustor 310 is started.

In the time of turbine starting operation from the combustion initiation (ignition) in the combustor 310 to a turbine initial load, a pressure in the above-described combustor liner 330 is low in an initial time of turbine starting operation from the ignition to a predetermined time. In the low pressure state in the combustor liner 330, a turbulent burning velocity is small. Hence, stable combustion cannot be obtained, which sometimes extinguishes flames.

Further, since the flow rates of the fuel and the oxygen supplied to the combustor liner 330 are set to the stoichiometric mixture ratio, the flow rate of oxygen is the minimum flow rate necessary for complete combustion. Moreover, carbon dioxide which is an inert gas is introduced around flames from the cooling holes 331 and the dilution hole 332. Hence, the carbon dioxide flows into the flames, which makes the flames unstable.

As described above, in the initial time of turbine starting operation, in the combustor liner 330, the turbulent burning velocity is small, and the combustion is performed in the state of mixing with the inert gas in addition to the absence of excess oxygen. Hence, the stable combustion cannot be obtained, which sometimes extinguishes the flames.

DETAILED DESCRIPTION

Hereinafter, an embodiment of the present invention will be described in reference to the drawings.

In one embodiment, in a method for operating a gas turbine combustor, the gas turbine combustor includes: a casing; a combustor liner which is disposed in the casing and combusts a fuel and an oxidant; a fuel supply part which supplies the fuel to the combustor liner; an oxidant supply part which supplies the oxidant to the combustor liner; and a controller which controls a flow rate of the fuel supplied from the fuel supply part and a flow rate of the oxidant supplied from the oxidant supply part, in which through a circulation system connecting an outlet of a turbine and the casing, an exhaust gas discharged from the turbine is circulated in the casing as a circulating gas, and the circulating gas is introduced into the combustor liner through through holes provided in the combustor liner.

In the method for operating the gas turbine combustor, before ignition in the gas turbine combustor, a mixed gas containing oxygen in a predetermined concentration is circulated as the circulating gas. Then, in an operating time from a time of ignition in the gas turbine combustor to a time of a rated load of the turbine, from the time of ignition until reaching stable combustion conditions allowing stable combustion, a combustion gas is circulated as the circulating gas. The combustion gas is maintained a same oxygen concentration as an oxygen concentration in the mixed gas by controlling the flow rate of the fuel supplied from the fuel supply part and the flow rate of the oxidant supplied from the oxidant supply part by the controller.

Figure 1:
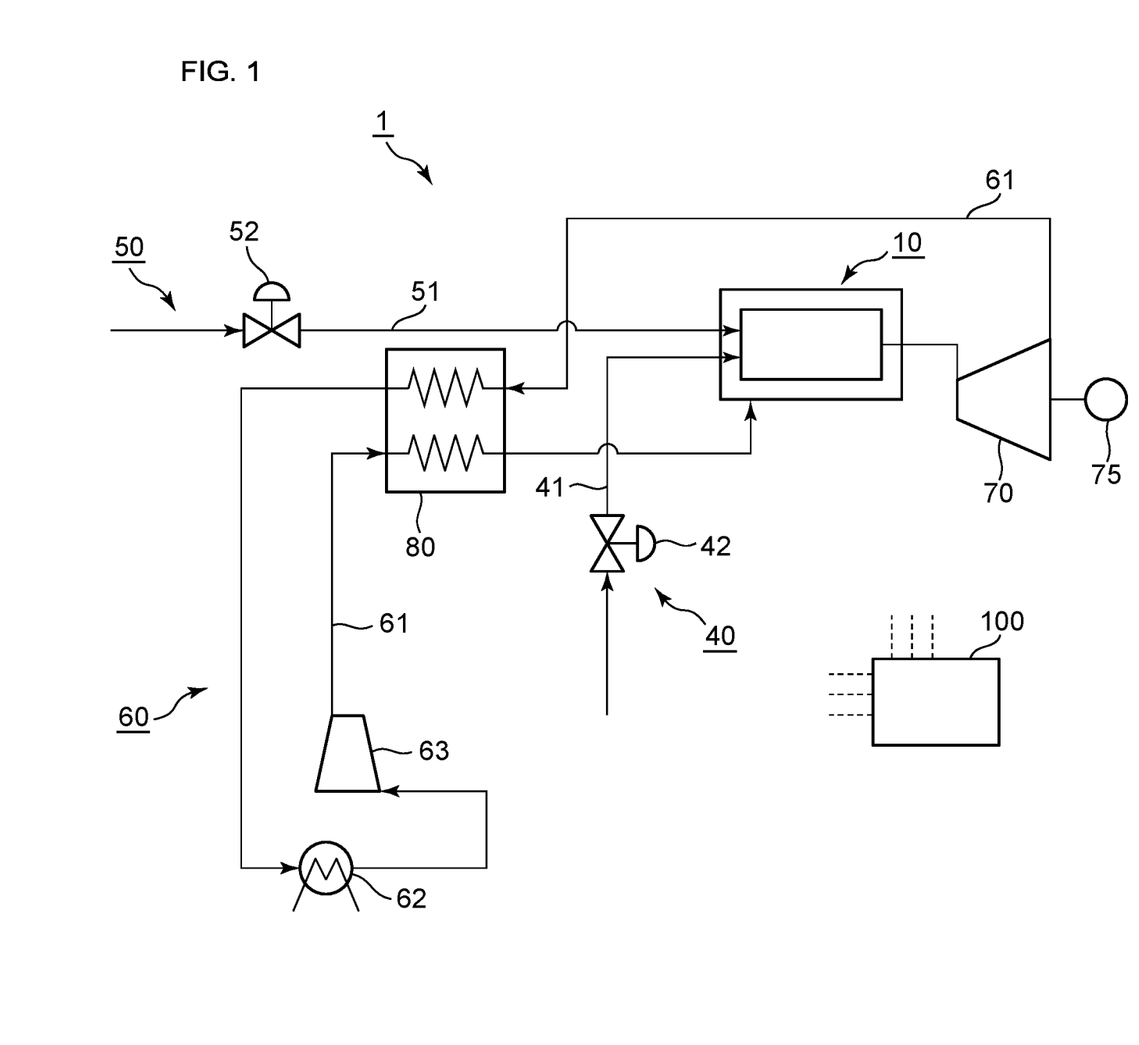
FIG. 1 is a system diagram of a gas turbine facility in which a method for operating a combustor of an embodiment is performed.

FIG. 1 is a system diagram of a gas turbine facility 1 in which the method for operating the combustor of the embodiment is performed. As illustrated in FIG. 1, the gas turbine facility 1 includes a combustor 10, a fuel supply part 40, an oxidant supply part 50, a gas circulation system 60, a turbine 70, a generator 75, a regenerative heat exchanger 80, and a controller 100. Note that the combustor 10 functions as a gas turbine combustor.

The fuel supply part 40 supplies a fuel to the combustor 10. The fuel supply part 40 includes a pipe 41. The pipe 41 is provided between a fuel supply source (not illustrated) and the combustor 10. Further, the pipe 41 is provided with a flow rate regulating valve 42 which regulates a flow rate of the fuel.

Here, as the fuel, for example, hydrocarbon such as methane or natural gas is used. Further, as the fuel, for example, a coal gasification gas fuel containing carbon monoxide, hydrogen, and the like can also be used.

The oxidant supply part 50 supplies an oxidant to the combustor 10. The oxidant supply part 50 includes a pipe 51. The pipe 51 is provided between an air separating apparatus (not illustrated) which separates oxygen from the air and the combustor 10, for example. The pipe 51 is provided with a flow rate regulating valve 52 which regulates a flow rate of the oxidant.

Here, as the oxidant, for example, oxygen, a mixed gas in which carbon dioxide is mixed with oxygen, or the like can be cited. As the carbon dioxide contained in the mixed gas, for example, a part of carbon dioxide flowing through the gas circulation system 60 is used.

Note that a compressor which pressurizes the oxidant is provided in the pipe 51 though not illustrated. For example, even when a circulating gas pressurized to a critical pressure or more depending on operating conditions flows through the gas circulation system 60, this compressor can pressurize the oxidant to a pressure allowing supply to the combustor 10.

Further, the oxidant may be heated by passing the pipe 51 through the regenerative heat exchanger 80 and supplied to the combustor 10. In this case, the flow rate regulating valve 52 is provided on a more upstream side than the regenerative heat exchanger 80.

The gas circulation system 60 includes a pipe 61 which circulates a circulating gas discharged from the turbine 70 through the combustor 10. The pipe 61 is provided between an outlet of the turbine 70 and the combustor 10.

Here, when the fuel and the oxidant are combusted in the combustor 10, a combustion gas circulates as the circulating gas. Note that this combustion gas is a mixed gas of the combustion gas produced by the combustion of the fuel and the oxidant and the circulating gas introduced into a later-described combustor liner 20.

Further, before starting the turbine (before combusting the fuel and the oxidant in the combustor 10), the mixed gas with which the gas circulation system 60 is filled beforehand and which contains oxygen in a predetermined concentration in carbon dioxide circulates as the circulating gas.

The pipe 61 is provided with a condenser 62 which removes water vapor contained in the combustion gas. Note that the water vapor in the combustion gas passes through the condenser 62, thereby condensing into water. The water is discharged through a pipe (not illustrated) to the outside, for example.

Further, the pipe 61 is provided with a compressor 63 which pressurizes the circulating gas. The compressor 63 pressurizes the combustion gas from which the water vapor has been removed in the condenser 62, for example. The compressor 63 can pressurize the combustion gas from which the water vapor has been removed to, for example, the critical pressure or more depending on the operating conditions. The condenser 62 and the compressor 63 are provided in the pipe 61 in an area through which the combustion gas cooled by the regenerative heat exchanger 80 flows.

The pipe 61 is provided to pass through the regenerative heat exchanger 80 twice. That is, the pipe 61 passes through the regenerative heat exchanger 80 once between the turbine 70 and the condenser 62. Then, the pipe 61 passes through the regenerative heat exchanger 80 again between the compressor 63 and the combustor 10.

Here, the combustion gas (circulating gas) discharged from the turbine 70 is cooled by passing through the regenerative heat exchanger 80. At this time, the circulating gas passing through the pipe 61 to circulate through the combustor 10 is heated by heat release from the combustion gas.

Note that the pipe 61 between the compressor 63 and the regenerative heat exchanger 80 is provided with a pipe branching from the pipe 61 though the pipe is not illustrated. Thus, a part of the circulating gas is discharged through the branch pipe to the outside.

The turbine 70 is rotationally moved by the combustion gas discharged from the combustor 10. For example, a generator 75 which generates electricity by making use of the rotational movement of the turbine 70 is connected to the turbine 70.

The controller 100 controls the flow rate regulating valve 42, the flow rate regulating valve 52, and the like to regulate the flow rates of the fuel and the oxidant supplied to the combustor 10, and the like.

Figure 2:
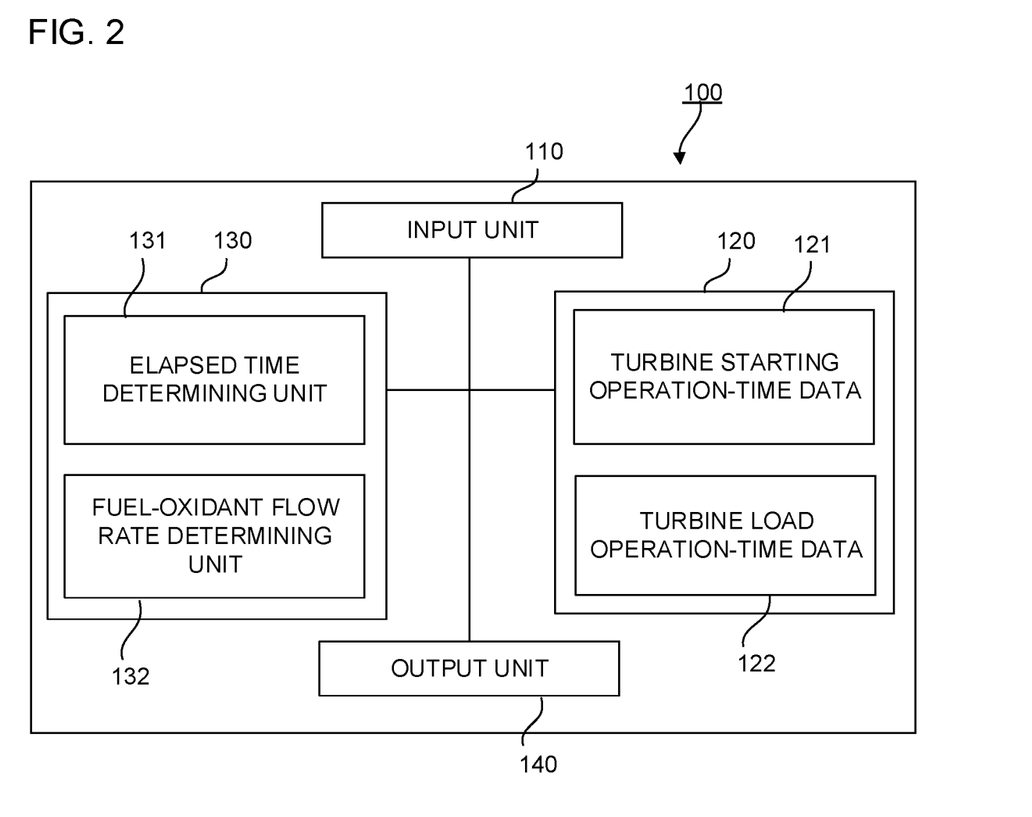
FIG. 2 is a block diagram illustrating a configuration of a controller which executes the method for operating the combustor of the embodiment.

Here, FIG. 2 is a block diagram illustrating a configuration of a controller 100 which executes the method for operating the combustor 10 of the embodiment. The controller 100 includes an input unit 110, a storage unit 120, a calculation unit 130, and an output unit 140.

To the input unit 110, for example, an ignition request signal and a load request signal from an input device or the like, a timer signal from a timer or the like, detection signals from various detection units, and the like are input.

The storage unit 120 is constituted by storage mediums such as read-only memory (ROM) and random access memory (RAM). The storage unit 120 stores turbine starting operation-time data 121 indicating a relationship between an operating time in the time of turbine starting operation from combustion initiation (ignition) in the combustor 10 to a turbine initial load, and, the fuel flow rate and the oxidant flow rate, and the like, for example. That is, in the turbine starting operation-time data 121, for example, data of the flow rates of the fuel and the oxidant supplied to the combustor 10 every predetermined time from the time of ignition to the time of the turbine initial load is stored.

Further, the storage unit 120 stores turbine load operation-time data 122 indicating a relationship between the fuel flow rate and the oxidant flow rate corresponding to a turbine load in the time of turbine load operation from the turbine initial load to a rated load, or the like, for example.

Note that in the respective pieces of the above-described data, information of valve opening degrees of the flow rate regulating valves corresponding to the flow rates or the like is also stored.

Here, the time of turbine starting operation is referred to as an operating period from the time of combustion initiation (the time of ignition) in the combustor 10 to the time of the turbine initial load. Further, in the time of turbine starting operation, the time from the ignition to a predetermined time entering a stable combustion zone is referred to as an initial time of turbine starting operation. Note that the stable combustion zone is a range satisfying stable combustion conditions allowing combustion in which combustion conditions are stable, and the stable combustion zone will be described later.

The turbine starting operation-time data 121 is data obtained in a turbine starting operation test in an actual machine. Further, the turbine load operation-time data 122 is data obtained in a turbine load operation test in the actual machine.

The calculation unit 130 executes various kinds of calculation processing by using input signals from the input unit 110, programs and the data stored in the storage unit 120, and the like, for example. The calculation unit 130 includes an elapsed time determining unit 131, a fuel-oxidant flow rate determining unit 132, and the like.

The elapsed time determining unit 131 determines an elapsed time from the time of ignition, or the like on the basis of the timer signal from the input unit 110.

The fuel-oxidant flow rate determining unit 132 specifies the flow rates of the fuel and the oxidant supplied to the combustor 10 in the time of turbine starting operation on the basis of a determination result in the elapsed time determining unit 131 and the turbine starting operation-time data 121.

Further, the fuel-oxidant flow rate determining unit 132 performs a calculation operation of the flow rates of the fuel and the oxidant supplied to the combustor 10 in the time of turbine load operation on the basis of the load request signal in the time of a turbine load and the turbine load operation-time data 122.

The output unit 140 outputs control signals from the calculation unit 130 to, for example, the flow rate regulating valves 42, 52, or the like. Note that the output unit 140 is communicably connected with the flow rate regulating valves 42, 52, or the like.

Here, the processing executed by the above-described controller 100 is implemented by, for example, a computer device or the like.

Next, a configuration of the combustor 10 will be described.

Figure 3:
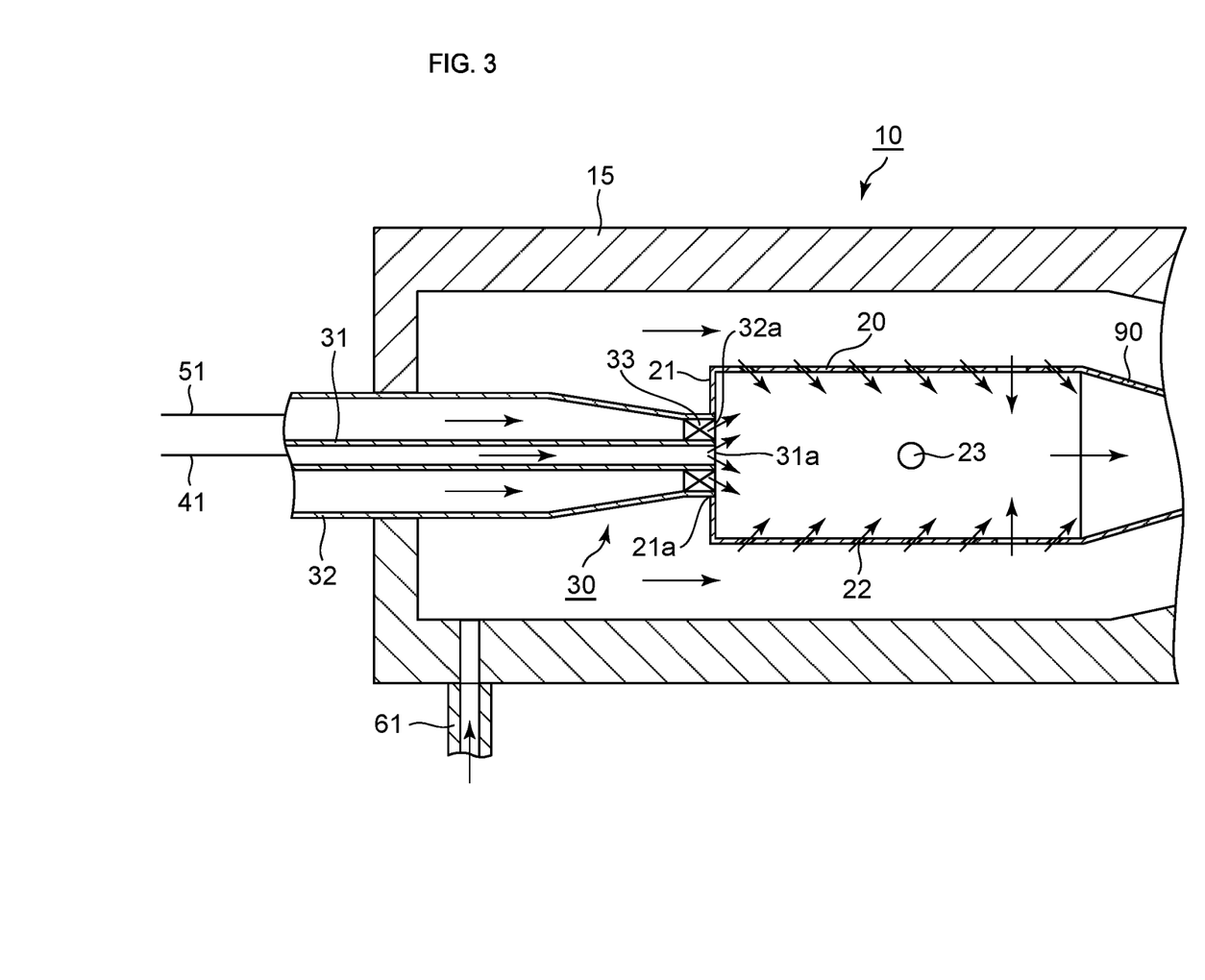
FIG. 3 schematically illustrates a vertical section of the combustor in which the method for operating the combustor of the embodiment is performed.

FIG. 3 schematically illustrates a vertical section of the combustor 10 in which the method for operating the combustor of the embodiment is performed. As illustrated in FIG. 3, the combustor 10 includes a combustor casing 15, a combustor liner 20, and a fuel-oxidant supply part 30.

The combustor casing 15 is constituted by a cylinder body housing the combustor liner 20 and the fuel-oxidant supply part 30.

The combustor liner 20 is constituted by a cylindrical member in which the fuel and the oxidant are combusted. One end (upstream end) of the combustor liner 20 is blocked by an upstream end wall 21, and the other end (downstream end) thereof is opened. Note that at the other end (downstream end) of the combustor liner 20, a transition piece 90 which guides the combustion gas discharged from the combustor liner 20 to the turbine 70 is provided.

The combustor liner 20 is constituted by a linearly extending cylinder body or the like, for example. Note that the combustor liner 20 may be constituted by a partially curved cylinder body or the like, for example.

In a side portion of the combustor liner 20, cooling holes 22 and a dilution hole 23 which introduce the circulating gas introduced from the pipe 61 into the combustor casing 15 into the combustor liner 20 are formed. Note that the cooling holes 22 and the dilution hole 23 function as through holes.

The cooling hole 22 is constituted by a cooling hole for film cooling, or the like, for example. Further, the dilution hole 23 is constituted by the through hole formed in a direction perpendicular to a direction of the center axis of the combustor liner 20, or the like, for example.

The fuel-oxidant supply part 30 penetrates the combustor casing 15, and the downstream end of the fuel-oxidant supply part 30 is disposed at the one end (upstream end) of the combustor liner 20. Specifically, for example, the downstream end of the fuel-oxidant supply part 30 is fitted into a through opening 21a formed in the upstream end wall 21 not to project into the combustor liner 20.

The fuel-oxidant supply part 30 includes a fuel supply pipe 31 and an oxidant supply pipe 32.

The fuel supply pipe 31 supplies the fuel into the combustor liner 20. The fuel supply pipe 31 is constituted by a cylindrical pipe or the like, for example. The fuel supply pipe 31 is coupled to the pipe 41 which supplies the fuel. An outlet 31a of the fuel supply pipe 31 provides a function as a fuel nozzle, for example. The outlet 31a is constituted by a single-hole fuel injection hole, a multi-hole fuel ejection hole, or the like, for example. The fuel is ejected from the outlet 31a of the fuel supply pipe 31 into the combustor liner 20.

The oxidant supply pipe 32 supplies the oxidant into the combustor liner 20. An outer periphery at a downstream end of the oxidant supply pipe 32 is fitted into the through opening 21a of the upstream end wall 21. The oxidant supply pipe 32 is constituted by a cylindrical pipe having an inside diameter larger than an outside diameter of the fuel supply pipe 31, or the like, for example.

The oxidant supply pipe 32 is provided around an outer periphery of the fuel supply pipe 31, as illustrated in FIG. 3, for example. For example, the center axis of the oxidant supply pipe 32 is on the same axis as the center axis of the fuel supply pipe 31. This causes an annular passage to be formed around the outer periphery of the fuel supply pipe 31.

Thus, for example, the fuel supply pipe 31 and the oxidant supply pipe 32 are formed in a double-pipe structure. The fuel is ejected from the central fuel ejection hole and the oxidant is ejected from the annular flow passage formed around the central fuel ejection hole. That is, a diffusion combustion system is adopted to the combustor 10.

At an outlet 32a of the annular passage between the fuel supply pipe 31 and the oxidant supply pipe 32, for example, a swirler 33 which forms swirling flow of the oxidant is provided. The swirler 33 is provided with a plurality of blades in a circumferential direction in the annular passage. The blades are disposed to be inclined at a predetermined angle to the axial direction of the annular passage.

The oxidant passes through the swirler 33, and thereby the swirling flow having a circumferential velocity component is ejected into the combustor liner 20. Thus, shaping the oxidant into the swirling flow causes mixing of the fuel and the oxidant to be promoted to form stable flames in the combustor liner 20.

The pipe 61 which circulates the circulating gas is connected to the combustor casing 15. The pipe 61 is connected to a side portion of the combustor casing 15 on a side where the fuel-oxidant supply part 30 penetrates it, for example.

The pipe 61 supplies the circulating gas between the combustor casing 15, and, the fuel-oxidant supply part 30 and the combustor liner 20. The circulating gas is introduced from the previously-described cooling holes 22 and dilution hole 23 of the combustor liner 20 into the combustor liner 20 as a cooling medium or a dilution medium.

The circulating gas introduced into the combustor liner 20 is introduced around or down flames formed in the combustor liner 20. The flames burn while catching the introduced circulating gas. In other words, a combustion reaction progresses while the circulating gas is mixed in a combustion zone where the flames are formed.

Next, a method for operating the combustor 10 will be described.

Figure 4:
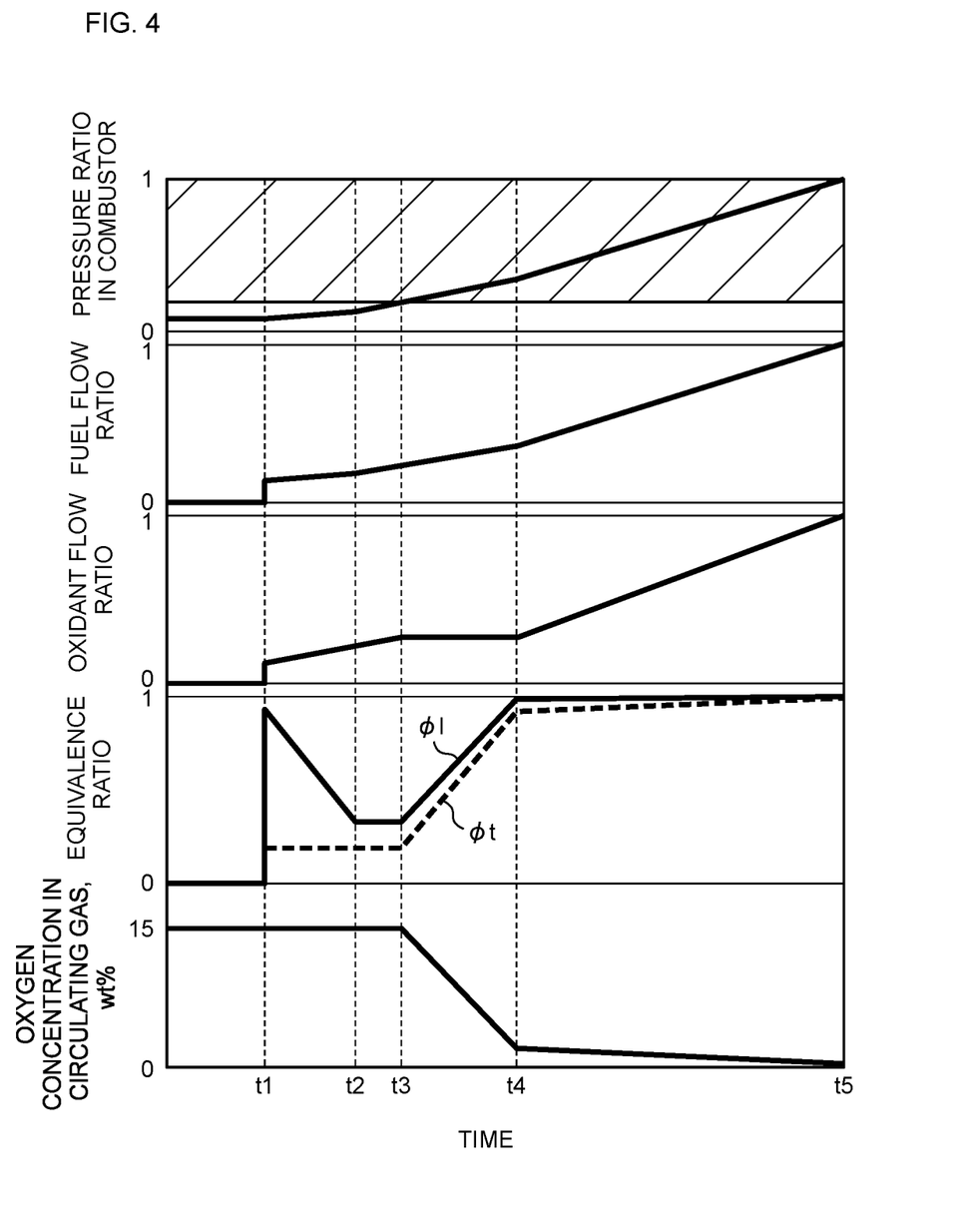
FIG. 4 is a time chart for explaining the method for operating the combustor of the embodiment.
Figure 5:
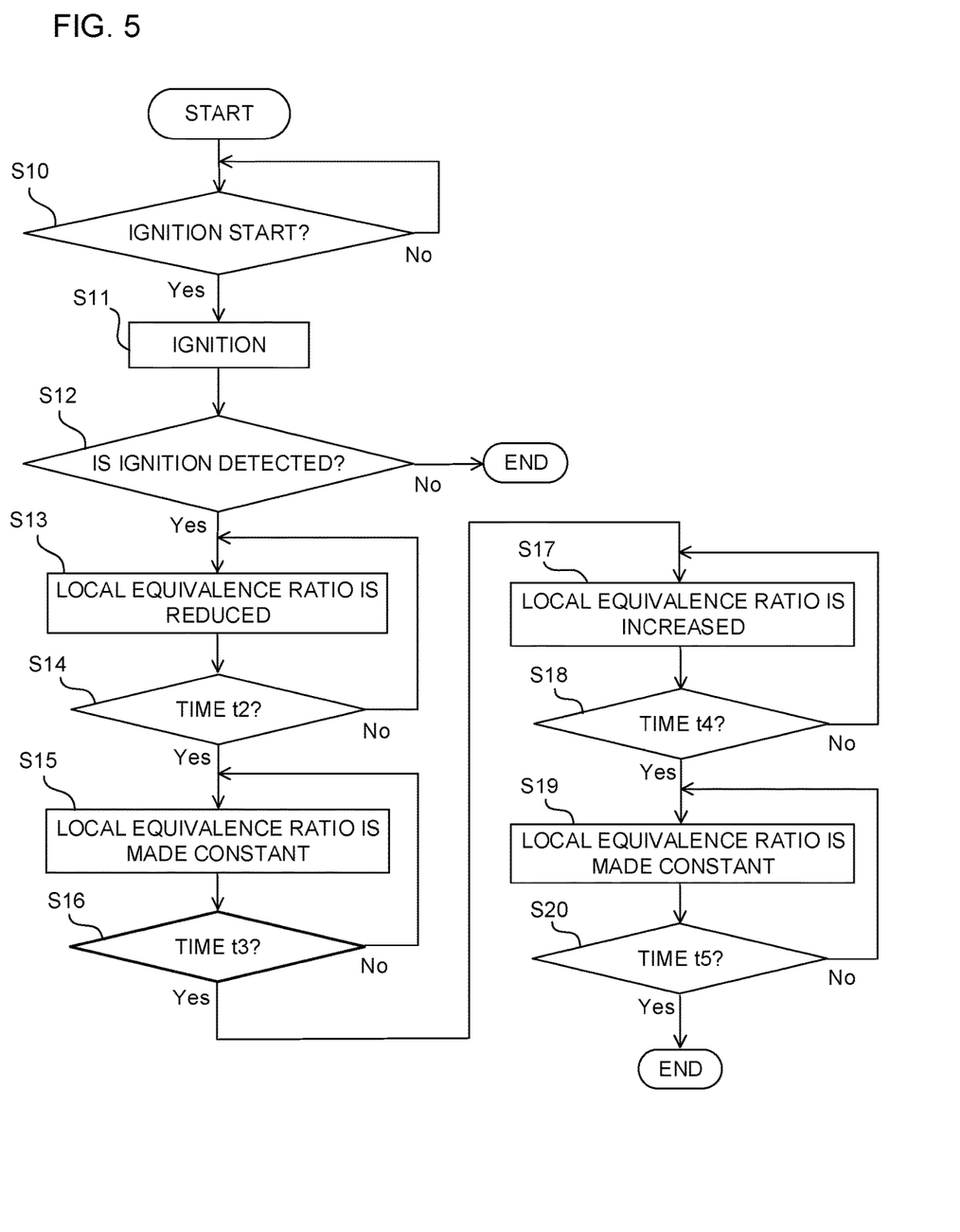
FIG. 5 is a flow chart for explaining the method for operating the combustor of the embodiment.

FIG. 4 is a time chart for explaining the method for operating the combustor 10 of the embodiment. FIG. 5 is a flow chart for explaining the method for operating the combustor 10 of the embodiment.

Here, a horizontal axis in FIG. 4 indicates a time. A vertical axis in FIG. 4 indicates a pressure ratio in the combustor 10, a fuel flow ratio, an oxidant flow ratio, an equivalence ratio, and an oxygen concentration (wt %) of the circulating gas. Note that in a portion indicating the pressure ratio in the combustor 10 in FIG. 4, a range of the later-described stable combustion zone is indicated with oblique lines.

Here, the pressure ratio in the combustor 10 is a pressure ratio in the combustor liner 20. In the pressure ratio in the combustor 10, a pressure in the combustor liner 20 at each time, when the pressure in the combustor liner 20 at the time of the rated load of the turbine is set to 1, is indicated by a ratio. In the fuel flow ratio, a fuel flow rate at each time, when the fuel flow rate at the time of the rated load of the turbine is set to 1, is indicated by a ratio. In the oxidant flow ratio, an oxidant flow rate at each time, when the oxidant flow rate at the time of the rated load of the turbine is set to 1, is indicated by a ratio.

Further, the oxygen concentration is an oxygen concentration in the circulating gas introduced to the combustor 10. That is, it is the oxygen concentration in the circulating gas introduced from the pipe 61 into the combustor casing 15.

As the equivalence ratio, a local equivalence ratio $\varphi l$ in the fuel-oxidant supply part 30 and a total equivalence ratio $\varphi t$ in the combustor 10 (combustor liner 20) are indicated.

The local equivalence ratio $\varphi l$ is an equivalence ratio calculated on the basis of flow rates of the fuel and the oxygen supplied to the fuel-oxidant supply part 30. In other words, the local equivalence ratio $\varphi l$ is the equivalence ratio calculated on the basis of the flow rate of the fuel ejected from the fuel supply pipe 31 into the combustor liner 20 and the flow rate of the oxygen ejected from the oxidant supply pipe 32 into the combustor liner 20.

The total equivalence ratio $\varphi t$ is an equivalence ratio calculated on the basis of flow rates of the fuel and the oxygen supplied to the combustor 10. That is, the total equivalence ratio $\varphi t$ is calculated also in consideration of a flow rate of oxygen contained in the circulating gas supplied into the combustor liner 20. In other words, the total equivalence ratio $\varphi t$ is the equivalence ratio calculated on the basis of the flow rate of the fuel ejected from the fuel supply pipe 31 into the combustor liner 20, and the flow rates of the oxygen ejected from the oxidant supply pipe 32 into the combustor liner 20 and the oxygen contained in the circulating gas introduced into the combustor liner 20.

Incidentally, the above-described local equivalence ratio $\varphi l$ and total equivalence ratio $\varphi t$ are each calculated by dividing a fuel-air ratio by a stoichiometric fuel-air ratio.

In FIG. 4, the time of turbine starting operation is from a time t1 to a time t4 (the time t1 or more to less than the time t4). In the time of turbine starting operation, the initial time of turbine starting operation is from the time t1 to a time t3 (the time t1 or more to less than the time t3). The time of turbine load operation is from the time t4 to a time t5 (the time t4 or more to less than the time t5).

In the gas turbine facility 1, before starting the turbine, that is, before initiating combustion in the combustor 10 (less than the time t1), the mixed gas with which the gas circulation system 60 is filled beforehand is circulated through the combustor 10 as the circulating gas. That is, the mixed gas circulates through the pipe 61, the combustor 10, and the turbine 70. The mixed gas is pressurized by the compressor 63 in the circulation.

Here, the mixed gas is carbon dioxide in which oxygen is contained in a predetermined concentration. The oxygen concentration in the mixed gas is set in a range of 10 to 15 wt %. FIG. 4 illustrates one example when the oxygen concentration in the mixed gas is set to 15 wt %. Incidentally, the reason why the oxygen concentration in the mixed gas is set in this range is described later.

(Time of Ignition: Time t1)

In a state in which the mixed gas is circulated through the combustor 10, the oxidant and the fuel are supplied to the combustor 10, and ignited by an ignition device. Here, the time of ignition (time t1) functions as a first time.

As illustrated in FIG. 5, the fuel-oxidant flow rate determining unit 132 of the controller 100 determines whether or not an ignition start signal is input in the input unit 110 (Step S10).

In the determination of Step S10, when the ignition start signal is determined not to be input (No in Step S10), the fuel-oxidant flow rate determining unit 132 executes the processing of Step S10 again.

In the determination of Step S10, when the ignition start signal is determined to be input (Yes in Step S10), the fuel-oxidant flow rate determining unit 132 executes control for ignition (Step S11).

In Step S11, the fuel-oxidant flow rate determining unit 132 specifies the flow rates of the fuel and the oxidant supplied to the combustor 10 at the time of ignition in reference to the turbine starting operation-time data 121. Then, the fuel-oxidant flow rate determining unit 132 outputs signals for supplying the oxidant and the fuel to the fuel-oxidant supply part 30 of the combustor 10 to the output unit 140.

The output unit 140 outputs the signals from the fuel-oxidant flow rate determining unit 132 to the flow rate regulating valve 52 and the flow rate regulating valve 42. This causes adjustment of opening degrees of the flow rate regulating valve 52 and the flow rate regulating valve 42 and supply of the fuel and the oxidant at predetermined flow rates through the fuel-oxidant supply part 30 into the combustor liner 20.

At this time, the local equivalence ratio is set to be a first equivalence ratio. Here, the first equivalence ratio is set in a range of 0.8 to 0.9. FIG. 4 illustrates one example when the first equivalence ratio is set to 0.84. Incidentally, the reason why the first equivalence ratio is set in this range is described later.

Hence, the fuel and the oxidant are ejected from the fuel supply pipe 31 and from the oxidant supply pipe 32 into the combustor liner 20, and ignited by the ignition device to form flames. (Time t1 to time t2)

As illustrated in FIG. 5, the fuel-oxidant flow rate determining unit 132 determines whether or not a detection signal from a flame detector is input in the input unit 110 (Step S12).

In the determination of Step S12, when the detection signal is determined not to be input during a predetermined time (No in Step S12), the fuel-oxidant flow rate determining unit 132 stops the supply of the fuel and the oxidant to the combustor 10, for example. Then, for example, the operation of the combustor 10 is stopped.

In the determination of Step S12, when the detection signal is determined to be input (Yes in Step S12), the fuel-oxidant flow rate determining unit 132 executes control of reducing the local equivalence ratio $\varphi l$ (Step S13).

In Step S13, as illustrated in FIG. 4, the fuel-oxidant flow rate determining unit 132 executes the control of reducing the local equivalence ratio $\varphi l$ from after detecting the detection signal from the flame detector which is input in the input unit 110, that is, after the ignition (after the time t1) to a second time (time t2) later than the time t1 (from after the time t1 to less than the time t2), for example. Note that the time t2 functions as the second time.

Here, in the combustor 10, the local equivalence ratio $\varphi l$ is gradually reduced from the first equivalence ratio to a second equivalence ratio smaller than the first equivalence ratio while the fuel flow rate and the oxidant flow rate are increased.

At this time, the oxygen concentration in the circulating gas circulated through the combustor 10 is maintained in the same concentration as the oxygen concentration in the mixed gas circulated through the combustor 10 before the ignition (15 wt % in FIG. 4). In other words, the local equivalence ratio $\varphi l$ is reduced while the total equivalence ratio $\varphi t$ is maintained constant.

Here, the second equivalence ratio is set in a range of 0.35 to 0.45. FIG. 4 illustrates one example when the second equivalence ratio is set to 0.40. Incidentally, the reason why the second equivalence ratio is set in this range is described later.

Specifically, the elapsed time determining unit 131 determines an elapsed time from the time t1 on the basis of an output signal from the timer, and outputs its determination information to the fuel-oxidant flow rate determining unit 132. The fuel-oxidant flow rate determining unit 132 specifies the flow rates of the fuel and the oxidant supplied to the combustor 10, which correspond to the elapsed time from the time t1, on the basis of the determination information from the elapsed time determining unit 131 and the turbine starting operation-time data 121.

Then, the fuel-oxidant flow rate determining unit 132 outputs signals for supplying the oxidant and the fuel at predetermined flow rates to the fuel-oxidant supply part 30 of the combustor 10 to the output unit 140 every predetermined elapsed time.

The output unit 140 outputs the signals from the fuel-oxidant flow rate determining unit 132 to the flow rate regulating valve 52 and the flow rate regulating valve 42. This causes adjustment of the opening degrees of the flow rate regulating valve 52 and the flow rate regulating valve 42 and supply of the fuel and the oxidant at the predetermined flow rates through the fuel-oxidant supply part 30 into the combustor liner 20.

(Time t2 to Time t3)

As illustrated in FIG. 5, the elapsed time determining unit 131 determines whether or not to reach the time t2 on the basis of an output signal from the timer (Step S14).

In the determination of Step S14, for determination not to reach the time t2 (No in Step S14), the elapsed time determining unit 131 outputs a determination result thereof to the fuel-oxidant flow rate determining unit 132. Then, the fuel-oxidant flow rate determining unit 132 continues the processing of Step S13.

In the determination of Step S14, for determination to reach the time t2 (Yes in Step S14), the elapsed time determining unit 131 outputs a determination result thereof to the fuel-oxidant flow rate determining unit 132. Then, the fuel-oxidant flow rate determining unit 132 executes control for maintaining the local equivalence ratio $\varphi l$ constant (Step S15).

In Step S15, as illustrated in FIG. 4, the fuel-oxidant flow rate determining unit 132 executes the control of maintaining the local equivalence ratio $\varphi l$ constant from the time t2 to a third time (time t3) later than the time t2 (from the time t2 or more to less than the time t3). Note that the time t3 functions as the third time.

Here, in the combustor 10, the local equivalence ratio $\varphi l$ is maintained at the second equivalence ratio while the fuel flow rate and the oxidant flow rate are increased.

At this time, the oxygen concentration in the circulating gas circulated through the combustor 10 is maintained in the same concentration as the oxygen concentration in the mixed gas circulated through the combustor 10 before the ignition (15 wt % in FIG. 4). In other words, the local equivalence ratio $\varphi l$ is maintained at the second equivalence ratio while the total equivalence ratio $\varphi t$ is maintained constant. Note that at the time t3, combustion conditions satisfy the stable combustion conditions, and a combustion state reaches the later-described stable combustion zone.

Further, the elapsed time determining unit 131 determines an elapsed time from the time t2 (or the elapsed time from the time t1) on the basis of an output signal from the timer, for example. The elapsed time determining unit 131 outputs determination information of the elapsed time to the fuel-oxidant flow rate determining unit 132.

The fuel-oxidant flow rate determining unit 132 specifies the flow rates of the fuel and the oxidant supplied to the combustor 10, which correspond to the elapsed time from the time t2, on the basis of the determination information from the elapsed time determining unit 131 and the turbine starting operation-time data 121.

Then, the fuel-oxidant flow rate determining unit 132 outputs signals for supplying the oxidant and the fuel at predetermined flow rates to the fuel-oxidant supply part 30 of the combustor 10 to the output unit 140 every predetermined elapsed time.

The output unit 140 outputs the signals from the fuel-oxidant flow rate determining unit 132 to the flow rate regulating valve 52 and the flow rate regulating valve 42. This causes adjustment of the opening degrees of the flow rate regulating valve 52 and the flow rate regulating valve 42 and supply of the fuel and the oxidant at the predetermined flow rates through the fuel-oxidant supply part 30 into the combustor liner 20.

(Time t3 to Time t4)

As illustrated in FIG. 5, the elapsed time determining unit 131 determines whether or not to reach the time t3 on the basis of an output signal from the timer (Step S16).

In the determination of Step S16, for determination not to reach the time t3 (No in Step S16), the elapsed time determining unit 131 outputs a determination result thereof to the fuel-oxidant flow rate determining unit 132. Then, the fuel-oxidant flow rate determining unit 132 continues the processing of Step S15.

In the determination of Step S16, for determination to reach the time t3 (Yes in Step S16), the elapsed time determining unit 131 outputs a determination result thereof to the fuel-oxidant flow rate determining unit 132. Then, the fuel-oxidant flow rate determining unit 132 executes control for increasing the local equivalence ratio $\varphi l$ (Step S17).

In Step S17, as illustrated in FIG. 4, the fuel-oxidant flow rate determining unit 132 executes the control of increasing the local equivalence ratio $\varphi l$ from the time t3 to a fourth time (time t4) later than the time t3 (from the time t3 or more to less than the time t4).

Here, in the combustor 10, there is illustrated one example in which the local equivalence ratio $\varphi l$ is increased from the second equivalence ratio to a third equivalence ratio larger than the second equivalence ratio by increasing the flow rate of the fuel while the flow rate of the oxidant is maintained constant. Note that also by increasing the flow rate of the fuel while the flow rate of the oxidant is increased, the local equivalence ratio $\varphi l$ may be increased from the second equivalence ratio to the third equivalence ratio larger than the second equivalence ratio.

At this time, the oxygen concentration in the circulating gas circulated to the combustor 10 is lowered from the same oxygen concentration as the oxygen concentration in the mixed gas circulated to the combustor 10 before the ignition (15 wt % in FIG. 4).

Here, the third equivalence ratio is set to 1.0. In the gas turbine facility 1, excess oxygen and fuel preferably do not remain in the combustion gas discharged from the combustor 10 at the time of the rated load of the turbine. Therefore, from the time t3 to the time t4, increasing the local equivalence ratio $\varphi l$ to 1.0 reduces the oxygen concentration in the circulating gas.

Further, the elapsed time determining unit 131 determines an elapsed time from the time t3 (or the elapsed time from the time t1) on the basis of an output signal from the timer, for example. The elapsed time determining unit 131 outputs determination information of the elapsed time to the fuel-oxidant flow rate determining unit 132.

The fuel-oxidant flow rate determining unit 132 specifies the flow rates of the fuel and the oxidant supplied to the combustor 10, which correspond to the elapsed time from the time t3, on the basis of the determination information from the elapsed time determining unit 131 and the turbine starting operation-time data 121.

Then, the fuel-oxidant flow rate determining unit 132 outputs signals for supplying the oxidant and the fuel at predetermined flow rates to the fuel-oxidant supply part 30 of the combustor 10 to the output unit 140 every predetermined elapsed time.

The output unit 140 outputs the signals from the fuel-oxidant flow rate determining unit 132 to the flow rate regulating valve 52 and the flow rate regulating valve 42. This causes adjustment of the opening degrees of the flow rate regulating valve 52 and the flow rate regulating valve 42 and supply of the fuel and the oxidant at the predetermined flow rates through the fuel-oxidant supply part 30 into the combustor liner 20.

(Time t4 to Time t5)

As illustrated in FIG. 5, the elapsed time determining unit 131 determines whether or not to reach the time t4 on the basis of an output signal from the timer (Step S18).

In the determination of Step S18, for determination not to reach the time t4 (No in Step S18), the elapsed time determining unit 131 outputs a determination result thereof to the fuel-oxidant flow rate determining unit 132. Then, the fuel-oxidant flow rate determining unit 132 continues the processing of Step S17.

In the determination of Step S18, for determination to reach the time t4 (Yes in Step S18), the elapsed time determining unit 131 outputs a determination result thereof to the fuel-oxidant flow rate determining unit 132. Then, the fuel-oxidant flow rate determining unit 132 executes control for maintaining the local equivalence ratio $\varphi l$ constant (Step S19).

In Step S19, as illustrated in FIG. 4, the fuel-oxidant flow rate determining unit 132 executes the control of maintaining the local equivalence ratio $\varphi l$ constant from the time t4 to a fifth time (time t5) later than the time t4 (from the time t4 or more to less than the time t5).

Here, in the combustor 10, the local equivalence ratio $\varphi l$ is maintained at the third equivalence ratio while the fuel flow rate and the oxidant flow rate are increased.

At this time, the oxygen concentration in the circulating gas circulated to the combustor 10 is lowered from the oxygen concentration in the circulating gas at the time t4. Then, the oxygen concentration in the circulating gas at the time t5 becomes "0" wt %. That is, at the time t5, the circulating gas does not contain oxygen. Further, at the time t5, the total equivalence ratio $\varphi t$ becomes the third equivalence ratio (1.0) the same as the local equivalence ratio $\varphi l$.

Note that a turbine load starts to be generated from the time t4. The time t5 is the time of the rated load of the turbine.

From the time t4 on (the time t4 or more), control based on load regulating operation is executed. The fuel-oxidant flow rate determining unit 132 specifies the flow rates of the fuel and the oxidant supplied to the combustor 10 on the basis of the load request signal and the turbine load operation-time data to maintain the local equivalence ratio $\varphi l$ at the third equivalence ratio while the fuel flow rate and the oxidant flow rate are increased in the load regulating operation.

Then, the fuel-oxidant flow rate determining unit 132 outputs signals for supplying the oxidant and the fuel at predetermined flow rates to the fuel-oxidant supply part 30 of the combustor 10 to the output unit 140.

The output unit 140 outputs the signals from the fuel-oxidant flow rate determining unit 132 to the flow rate regulating valve 52 and the flow rate regulating valve 42. This causes adjustment of the opening degrees of the flow rate regulating valve 52 and the flow rate regulating valve 42 and supply of the fuel and the oxidant at the predetermined flow rates through the fuel-oxidant supply part 30 into the combustor liner 20.

(Grounds for Ranges of Oxygen Concentration in Mixed Gas, First Equivalence Ratio, and Second Equivalence Ratio)

Here, the reason why the oxygen concentration in the mixed gas, the first equivalence ratio, and the second equivalence ratio are set in the previously described ranges will be described.

Figure 6:
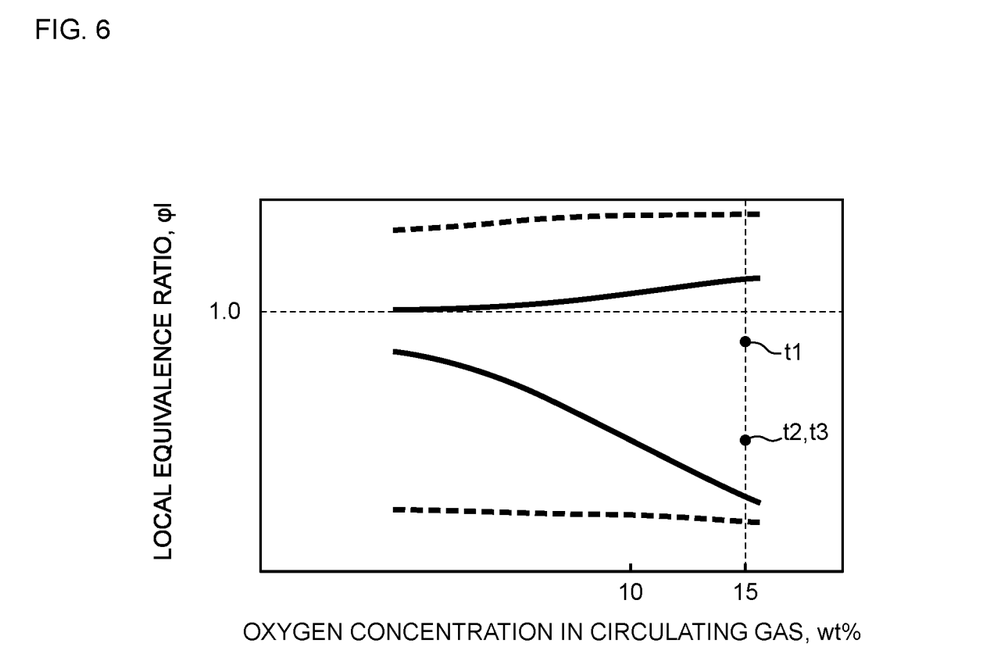
FIG. 6 is a chart illustrating a flame holding range in an initial time of turbine starting operation of the combustor according to the embodiment.
Figure 7:
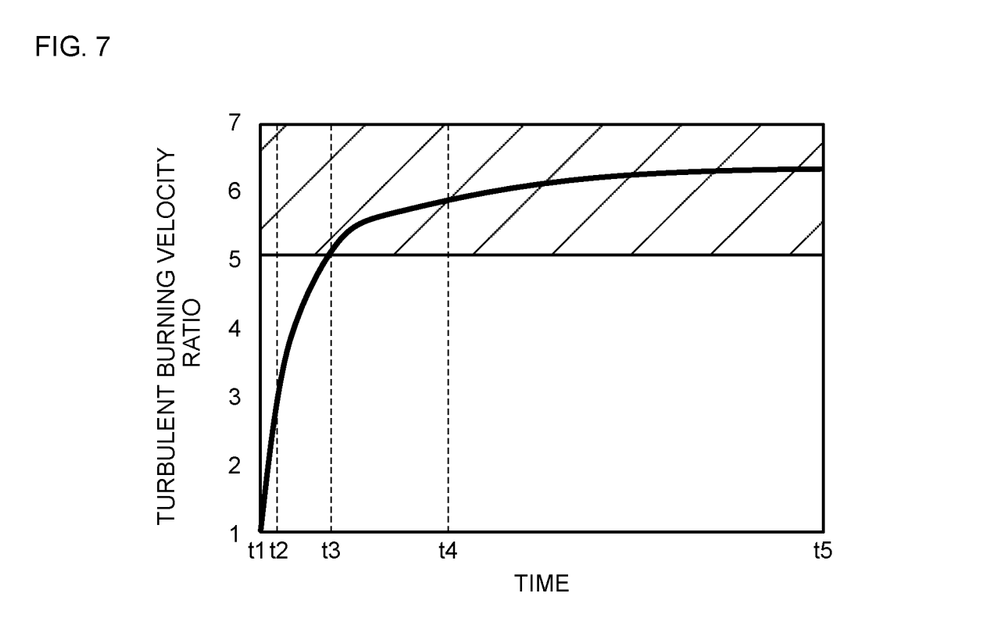
FIG. 7 is a chart for explaining a stable combustion zone in the combustor according to the embodiment.

FIG. 6 is a chart for explaining a flame holding range in the initial time of turbine starting operation of the combustor 10 according to the embodiment. FIG. 7 is a chart for explaining the stable combustion zone in the combustor 10 according to the embodiment.

Here, in FIG. 6, a horizontal axis indicates the oxygen concentration (wt %) in the circulating gas, and a vertical axis indicates the local equivalence ratio φl. In FIG. 6, the flame holding range in the time of the time t1 to the time t3 which is the initial time of turbine starting operation is indicated with solid lines, and the flame holding range in the stable combustion zone is indicated with dotted lines.

Further, FIG. 6 illustrates a relationship between the oxygen concentration in the circulating gas and the local equivalence ratio φl in the time of the time t1 to the time t3 which is the initial time of turbine starting operation. At the time t1 in FIG. 6, the oxygen concentration in the mixed gas is 15 wt %, and the local equivalence ratio φl is 0.9. At the time t2 and the time t3 in FIG. 6, the oxygen concentration in the mixed gas is 15 wt %, and the local equivalence ratio φl is 0.35.

Here, the flame holding range is a range where flames can be maintained in the combustor 10. The flame holding ranges are between the two solid lines and between the two dotted lines.

In FIG. 7, a horizontal axis indicates a time from the time of ignition (time t1) to the time of the rated load of the turbine (time t5), and a vertical axis indicates a turbulent burning velocity ratio. In FIG. 7, the turbulent burning velocity ratio from the time of ignition (time t1) to the time of the rated load of the turbine (time t5) is indicated with a solid line. Further, in FIG. 7, the stable combustion zone is indicated with oblique lines.

Here, in the turbulent burning velocity ratio, a turbulent burning velocity in the combustor liner 20 at each time, when the turbulent burning velocity in the combustor liner 20 at the time of ignition (time t1) is set to 1, is indicated by a ratio. Note that the turbulent burning velocity is obtained by a numerical analysis.

Further, the flame holding ranges illustrated in FIG. 6 and the stable combustion zone illustrated in FIG. 7 are obtained on the basis of the test results in the actual machine.

As illustrated in FIG. 6, the flame holding range in the initial time of turbine starting operation is smaller than the flame holding range in the stable combustion zone. Further, the flame holding range with respect to the local equivalence ratio φl in the initial time of turbine starting operation increases as the oxygen concentration in the circulating gas increases.

In a range where the oxygen concentration in the circulating gas is 10 to 15 wt %, in a state of maintaining the oxygen concentration in the circulating gas constant, even the local equivalent ratio φl is reduced to the local equivalent ratio φl at time t2 and time t3, the condition will still be in the flame holding range.

Further, setting the local equivalence ratios φl and the oxygen concentration in the circulating gas at the time t1, the time t2 and the time t3 in the previously described ranges allows the flame holding range to be maintained even though the respective conditions vary in presumable ranges.

From such reasons, the oxygen concentration in the mixed gas, the first equivalence ratio, and the second equivalence ratio are set in the previously described ranges.

Here, as illustrated in FIG. 7, the turbulent burning velocity ratio increases rapidly in the initial time of turbine starting operation (the time t1 to the time t3) after the ignition (after t1). This increase in the turbulent burning velocity ratio results from an increase in the turbulent burning velocity with a rise in pressure in the combustor 10 (in the combustor liner 20).

In general, the stability of flames improves with an increase in turbulent burning velocity. In the combustor 10, the stable combustion zone can be obtained in a range where the turbulent burning velocity ratio is five or more. That is, the combustion conditions of the stable combustion zone satisfy the turbulent burning velocity ratio of five or more which is under the stable combustion conditions.

This stable combustion zone is a zone where stable flames can be obtained in the time of turbine starting operation and the time of turbine load operation regardless of the condition of the oxygen concentration in the circulating gas. In the stable combustion zone, for example, the stable flames can be obtained even under the zero condition of the oxygen concentration in the circulating gas.

Here, in general, a turbulent burning velocity increases when a pressure in a combustor is increased. In the combustor 10, as illustrated in FIG. 4, the pressure is increased from the time t1 toward the time t5, and thereby the turbulent burning velocity also increases. The reason for falling within the stable combustion zone from the time t3 on (the time t3 or more) is considered to be that the turbulent burning velocity becomes a velocity equal to or more than a certain constant level, which is unlikely to extinguish flames.

The combustion conditions in the initial time of turbine starting operation (the time t1 to the time t3) in the combustor 10 do not fall within the stable combustion zone. However, the stable flames are maintained by setting the combustion conditions in the initial time of turbine starting operation to the oxygen concentration in the mixed gas, the first equivalence ratio, and the second equivalence ratio which are previously described.

That is, in the initial time of turbine starting operation (the time t1 to the time t3), as illustrated in FIG. 4, by maintaining the oxygen concentration in the circulating gas in the range of 10 to 15 wt %, oxygen is sufficiently supplied to flames to maintain the stable flames even in the range where the turbulent burning velocity ratio is less than five.

Further, the combustion conditions from the time t3 to the time t5 fall within the stable combustion zone, thereby maintaining the stable flames even though the oxygen concentration in the circulating gas is set to less than 10 wt %, and further zero.

As described above, according to the method for operating the gas turbine combustor of the embodiment, in the time of turbine starting operation, by containing oxygen in the circulating gas, oxygen is supplied by the circulating gas introduced to the combustion area in the combustor liner 20 also in addition to oxygen supplied from the fuel-oxidant supply part 30. This allows oxygen to be sufficiently supplied to flames to maintain the stable flames.

Further, in the initial time of turbine starting operation when the turbulent burning velocity is low and flames become unstable, maintaining the oxygen concentration in the circulating gas constant in the range of 10 to 15 wt % allows oxygen to be sufficiently supplied to flames to prevent the flames from being extinguished. Hence, the stable flames can be maintained even in the initial time of turbine starting operation.

According to the above described embodiment, it becomes possible to perform stable combustion in the initial time of turbine starting operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for operating a gas turbine combustor including:
   a casing;
   a combustor liner which is disposed in the casing and combusts a fuel and an oxidant;
   a fuel supply part which supplies the fuel to the combustor liner;
   an oxidant supply part which supplies the oxidant to the combustor liner; and
   a controller which controls a flow rate of the fuel supplied from the fuel supply part and a flow rate of the oxidant supplied from the oxidant supply part, the gas turbine combustor in which through a circulation system connecting an outlet of a turbine and the casing, an exhaust gas discharged from the turbine is circulated in the casing as a circulating gas, and the circulating gas is introduced into the combustor liner through through holes provided in the combustor liner, the method comprising:
   circulating, before ignition in the gas turbine combustor, a mixed gas containing oxygen in a predetermined concentration as the circulating gas; and
   circulating, in an operating time from a time of ignition in the gas turbine combustor to a time of a rated load of the turbine, from the time of ignition until reaching stable combustion conditions allowing stable combustion, a combustion gas as the circulating gas, the combustion gas being maintained a same oxygen concentration as an oxygen concentration in the mixed gas by controlling the flow rate of the fuel supplied from the fuel supply part and the flow rate of the oxidant supplied from the oxidant supply part by the controller.

2. The method for operating the gas turbine combustor according to claim 1,
   wherein the oxygen concentration in the mixed gas is 10 to 15 wt %.

3. The method for operating the gas turbine combustor according to claim 1, wherein
   the controller executes,
   at a first time which is the time of ignition,
   combustion with a local equivalence ratio calculated from the flow rate of the fuel supplied from the fuel supply part and the flow rate of the oxidant supplied from the oxidant supply part set at a first equivalence ratio,
   from the first time to a second time later than the first time,
   combustion with the local equivalence ratio gradually reduced from the first equivalence ratio to a second equivalence ratio smaller than the first equivalence ratio while the flow rate of the fuel and the flow rate of the oxidant are increased, and circulation, as the circulating gas, of the combustion gas in which the same oxygen concentration as the oxygen concentration in the mixed gas is maintained,
   from the second time to a third time, later than the second time, which is the time of reaching the stable combustion conditions,
   combustion with the local equivalence ratio maintained at the second equivalence ratio while the flow rate of the fuel and the flow rate of the oxidant are increased, and circulation, as the circulating gas, of the combustion gas in which the same oxygen concentration as the oxygen concentration in the mixed gas is maintained,
   from the third time to a time of rated operation of the turbine later than the third time,
   control of the flow rate of the fuel and the flow rate of the oxidant to increase the local equivalence ratio from the second equivalence ratio, and
   at the time of the rated operation of the turbine,
   setting the oxygen concentration in the circulating gas which is the combustion gas to zero.

4. The method for operating the gas turbine combustor according to claim 3,
   wherein the oxygen concentration in the mixed gas is 10 to 15 wt %.

5. The method for operating the gas turbine combustor according to claim 3,
   wherein the second equivalence ratio is 0.35 to 0.45.

6. The method for operating the gas turbine combustor according to claim 5,
   wherein the oxygen concentration in the mixed gas is 10 to 15 wt %.

7. The method for operating the gas turbine combustor according to claim 3,
   wherein the first equivalence ratio is 0.8 to 0.9.

8. The method for operating the gas turbine combustor according to claim 7,
   wherein the oxygen concentration in the mixed gas is 10 to 15 wt %.

9. The method for operating the gas turbine combustor according to claim 7,
   wherein the second equivalence ratio is 0.35 to 0.45.

10. The method for operating the gas turbine combustor according to claim 9,
    wherein the oxygen concentration in the mixed gas is 10 to 15 wt %.

* * * * *